US008340002B2

(12) United States Patent
Johansson et al.

(10) Patent No.: US 8,340,002 B2
(45) Date of Patent: Dec. 25, 2012

(54) LOAD CONTROL OF UE MBMS MEASUREMENT REPORTING

(75) Inventors: Johan Johansson, Stockholm (SE); Michael Roberts, Puteaux (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 12/432,547

(22) Filed: Apr. 29, 2009

(65) Prior Publication Data
US 2009/0274050 A1    Nov. 5, 2009

Related U.S. Application Data

(63) Continuation of application No. PCT/CN2006/002895, filed on Oct. 30, 2006.

(51) Int. Cl.
*H04B 1/44* (2006.01)

(52) U.S. Cl. ........ 370/282; 370/235; 370/237; 370/281; 370/283; 455/115.3; 455/422.1; 455/525

(58) Field of Classification Search .................. 370/235, 370/236, 237, 281, 282, 283; 455/115.3, 455/422.1, 525
See application file for complete search history.

(56) References Cited

U.S. PATENT DOCUMENTS

| 788,663 | A  | * | 5/1905 | Menas ........................ 128/108.1 |
| 5,812,531 | A  | * | 9/1998 | Cheung et al. ................. 370/255 |
| 6,347,091 | B1 | * | 2/2002 | Wallentin et al. .............. 370/437 |
| 6,374,112 | B1 | * | 4/2002 | Widegren et al. ........... 455/452.2 |
| 6,445,917 | B1 | * | 9/2002 | Bark et al. ..................... 455/423 |
| 6,674,739 | B1 | * | 1/2004 | Lee et al. ...................... 370/342 |
| 6,889,050 | B1 | * | 5/2005 | Willars et al. .............. 455/452.2 |
| 6,999,432 | B2 | * | 2/2006 | Zhang et al. ................... 370/328 |
| 7,212,824 | B2 | * | 5/2007 | Terry ............................. 455/450 |
| 7,272,400 | B1 | * | 9/2007 | Othmer ......................... 455/453 |
| 7,406,326 | B2 | * | 7/2008 | Kato et al. ..................... 455/509 |
| 7,509,127 | B2 | * | 3/2009 | Wang et al. .................... 455/439 |
| 7,602,802 | B2 | * | 10/2009 | Kim ............................. 370/432 |
| 7,613,476 | B2 | * | 11/2009 | Charriere et al. ............. 455/522 |
| 7,623,508 | B2 | * | 11/2009 | Khoury et al. ................ 370/352 |
| 7,623,869 | B2 | * | 11/2009 | Lee et al. ................... 455/452.2 |

(Continued)

FOREIGN PATENT DOCUMENTS

CN    1692578    11/2005

(Continued)

OTHER PUBLICATIONS

3GPP TR 23.898: 3rd Generation Partnership Project; Technical Specification Group Services and System Aspects; Access Class Barring and Overload Protection, Mar. 2005, V7.0.0.*

(Continued)

*Primary Examiner* — Ayaz Sheikh
*Assistant Examiner* — Andrew C Lee
(74) *Attorney, Agent, or Firm* — Staas & Halsey LLP

(57) ABSTRACT

An improved method and a communication means node implementing the method for load control in connection with a multimedia service transmission intended for multiple receivers over a wireless network are disclosed. The receivers in the wireless network are able to respond to requests communicated from an ordering entity by feeding back responses to a management entity in said wireless network. The feedback of these responses uses a different communication means, separate from said wireless network. This different communication means has limited communication resources. A transmission load caused in said different communication means by said feedback of said responses is according to the invention controlled by the different communication means itself.

25 Claims, 1 Drawing Sheet

U.S. PATENT DOCUMENTS

| | | | | |
|---|---|---|---|---|
| 7,634,223 | B2* | 12/2009 | Kelley et al. | 455/3.01 |
| 7,656,834 | B2* | 2/2010 | Lee et al. | 370/312 |
| 7,693,539 | B2* | 4/2010 | Yamada et al. | 455/525 |
| 7,706,318 | B2* | 4/2010 | Lee et al. | 370/322 |
| 2004/0105463 | A1* | 6/2004 | Cheung et al. | 370/468 |
| 2004/0133697 | A1 | 7/2004 | Mamaghani et al. | |
| 2004/0146041 | A1* | 7/2004 | Lee et al. | 370/349 |
| 2004/0151133 | A1* | 8/2004 | Yi et al. | 370/312 |
| 2004/0209623 | A1 | 10/2004 | Sauter et al. | |
| 2004/0224709 | A1* | 11/2004 | Yi et al. | 455/515 |
| 2005/0030966 | A1* | 2/2005 | Cai et al. | 370/432 |
| 2005/0043035 | A1* | 2/2005 | Diesen et al. | 455/454 |
| 2005/0076369 | A1* | 4/2005 | Cai et al. | 725/62 |
| 2005/0129058 | A1 | 6/2005 | Casaccia et al. | |
| 2005/0147040 | A1* | 7/2005 | Vayanos et al. | 370/235 |
| 2005/0180415 | A1* | 8/2005 | Cheung et al. | 370/389 |
| 2005/0192021 | A1* | 9/2005 | Lee et al. | 455/452.2 |
| 2006/0062179 | A1* | 3/2006 | Simonsson et al. | 370/328 |
| 2006/0068719 | A1* | 3/2006 | Hairapetian | 455/69 |
| 2006/0106865 | A1* | 5/2006 | Beming et al. | 707/104.1 |
| 2006/0153209 | A1 | 7/2006 | Venken | |
| 2006/0183498 | A1* | 8/2006 | Lee et al. | 455/552.1 |
| 2006/0218302 | A1* | 9/2006 | Chia et al. | 709/245 |
| 2006/0252439 | A1* | 11/2006 | Cai | 455/515 |
| 2007/0022200 | A1* | 1/2007 | Benkert et al. | 709/227 |
| 2007/0091815 | A1* | 4/2007 | Tinnakornsrisuphap et al. | 370/252 |
| 2007/0133565 | A1* | 6/2007 | Hyun et al. | 370/395.52 |
| 2007/0191018 | A1* | 8/2007 | Terry | 455/450 |
| 2007/0223703 | A1* | 9/2007 | Verma et al. | 380/278 |
| 2008/0137536 | A1* | 6/2008 | Hede | 370/236 |
| 2008/0267126 | A1* | 10/2008 | Vujcic et al. | 370/330 |
| 2008/0267271 | A1* | 10/2008 | Vook et al. | 375/219 |
| 2010/0226263 | A1* | 9/2010 | Chun et al. | 370/252 |
| 2011/0044223 | A1* | 2/2011 | Kim et al. | 370/312 |

FOREIGN PATENT DOCUMENTS

| | | |
|---|---|---|
| CN | 1747399 | 3/2006 |
| CN | 1794849 | 6/2006 |
| WO | WO 2004/100590 | 11/2004 |

OTHER PUBLICATIONS

3GPP TS 25.321: 3rd Generation Partnership Project; Technical Specification Group Radio Access Network; Medium Access Control (MAC) Protocol Specification, Sep. 2006, V7.2.0.

3GPP TS 25.331: 3rd Generation Partnership Project; Technical Specification Group Radio Access Network; Radio Resource Control (RRC); Protocol Specification, Sep. 2006, V7.2.0.

3GPP TS 25.346: 3rd Generation Partnership Project; Technical Specification Group Radio Access Network; Introduction of the Multimedia Broadcast Multicast Service (MBMS) in the Radio Access Network (RAN); Stage 2, Jun. 2006, V6.9.0.

3GPP TS 26.346: 3rd Generation Partnership Project; Technical Specification Group Services and System Aspects; Multimedia Broadcast/Multicast Service (MBMS); Protocols and Codecs, Sep. 2006, V6.6.0.

Office Action, mailed Oct. 8, 2010, in corresponding Chinese Application No. 200680055184.5 (13 pp.).

Written Opinion of the International Searching Authority, mailed Mar. 3, 2007, in corresponding International Application No. PCT/CN2006/002895 (3 pp.).

Chinese Office Action issued Sep. 14, 2011 in Chinese Patent Application No. 200680055184.5 (13 pages).

* cited by examiner

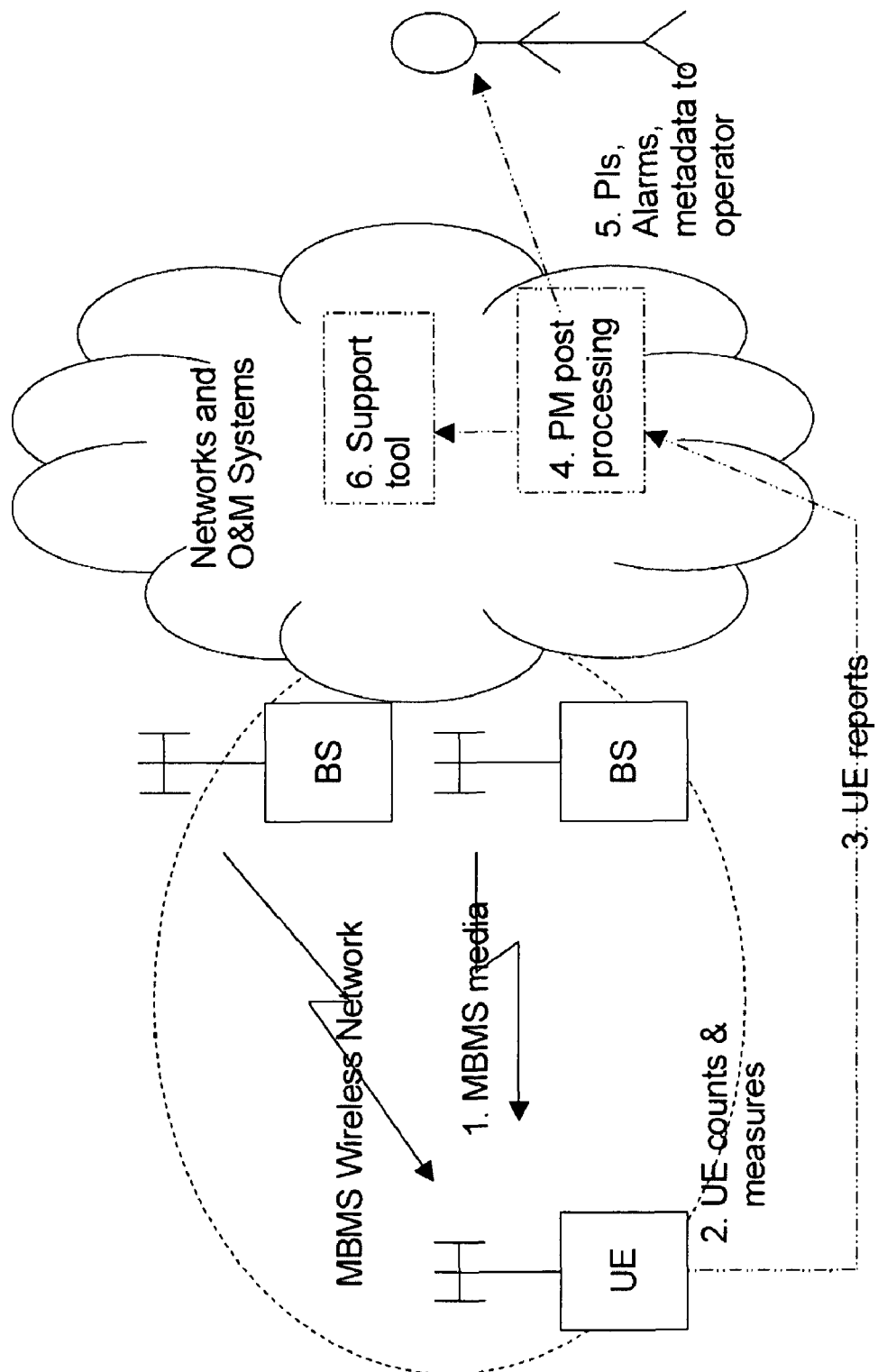

LOAD CONTROL OF UE MBMS MEASUREMENT REPORTING

CROSS-REFERENCE TO RELATED APPLICATION

This application is a continuation of International Application No. PCT/CN2006/002895, filed on Oct. 30, 2006, which is hereby incorporated by reference in its entirety.

FIELD OF THE INVENTION

The present invention relates to a method and a communication means node for performing load control in connection with a multimedia service transmission intended for multiple receivers over a wireless network, said receivers in said wireless network being able to respond to requests communicated from an ordering entity by feeding back responses to a management entity in said wireless network.

BACKGROUND OF THE INVENTION

Terrestrial broadcast services for small mobile devices with small antennas, e.g. for mobile TV in mobile phones, belong to an area that has gained a lot of attention. Multimedia service transmission intended for multiple receivers, e.g., Multimedia Broadcast and Multicast Services (MBMS), has been defined and developed for GSM and WCDMA mobile systems. Also for CDMA2000 there is a similar concept. In addition, standalone broadcast systems has been developed, e.g. DVB-H. All of these technologies, and related technologies, for terrestrial broadcast services for small handheld mobile devices, are subsequently referred to as MBMS or multimedia services.

It is possible to implement an MBMS system that is optimized for broadcast services, that only uses a Downlink (DL), i.e. non-duplex communication where information flows over the wireless interface only in the direction from Base Station (BS) to a receiver, such as a UE. A particular benefit of a downlink only system is that no radio spectrum resources are needed for an uplink (UL). Radio carrier and spectrum resources are needed only for the DL. Another benefit is that the radio characteristics of an UL can be ignored, and thus, efficiency-optimized DL-only Base Stations with high output power, and good coverage can be developed for such systems. Such MBMS systems, that only uses a wireless DL, is subsequently referred to as MBMS dedicated carrier (DC) systems or shortly Dedicated Carrier (DC) systems.

Terrestrial wireless systems that have MBMS functionality or techniques, and also can handle UL transmissions on radio spectrum resources that are either the same as the DL, or paired with spectrum resources of the DL, are referred to as MBMS mixed carrier (MC) systems, or shortly mixed carrier (MC) systems. The UL in a MBMS MC system could be used for UL signalling and/or for non-MBMS services requiring an UL, e.g. unicast services, as described below.

Terrestrial wireless systems that have the capability of point-to-point communication between the BS and the UE, UL or DL or both, are subsequently referred to as Unicast capable system, or shortly Unicast (UC) systems. Typical UC user services include voice-calls, video-calls, internet web-browsing, sending a message, etc.

A common deployment scenario for MBMS DC systems is that such a system is overlaid on a UC network, meaning that the DC and UC systems overlap in geographical coverage. The overlaid DC and UC systems may use the same or different network equipment and network resources or a combination. For example, such scenarios have been foreseen in discussions in 3GPP, where an MBMS DC system typically would be overlaid on a UC GSM, WCDMA, Long Term Evolution (LTE) network, and a typical UE would be capable of MBMS services distributed by MC or DC, and UC services.

As will be explained below, broadcasting or multicasting in systems such as MBMS systems or the like are also denoted multimedia service transmission intended for multiple receivers. The communication resource, not being a part of the MBMS system or the like, used for transferring feedback information from the UEs over the UC system is later also denoted as a different communication means. This different communication means can be of limited resources. In this document, the term limited resources, such as limited network resources, communication resources or transmission resources, means that these resources are momentarily limited. That is, these resources are at any given moment in time finite.

Network operators typically initiate network tuning based on results of statistics data collection and post-processing. This is how the network is optimized, e.g. protocol parameters are optimized to give best experienced user performance, radio and antenna parameters are optimized for good coverage, etc. Network tuning for optimization is a continuous process in the operation of a network.

Also responses regarding other information than network specific measurements can be ordered by the network. Such responses can include interactive services, such as voting or any other interactive operation that requires feedback from the UEs to an entity in the network, such as a management entity or the like.

Broadcast mechanisms have been proposed for initiating and controlling UE statistics measurements for MBMS. Also responses regarding other information than network specific measurements can be ordered by the network. Such responses can include interactive services, such as voting or any other interactive operation that requires feedback from the UEs.

When using broadcast mechanisms for controlling measurements or ordering interactive services, the MBMS network does not know how many UEs that are receiving this broadcast or even how many UEs that are in an active mode in the system. It is therefore impossible for the MBMS network to know how many UEs that will be triggered to perform such measurements or other reporting and how many UEs that will attempt to report the results of such measurements.

The primary bottleneck for these report peaks is the wireless interface of the communication means carrying the responses. It is assumed that other network nodes can store and forward such measurement reports and thereby better handle such overload peak situations. If not properly designed, the reporting of such measurements could result in peaks of high overload in the wireless interface of the communication means carrying the responses. The risk of getting peaks of overload is especially high in broadcast or multicast systems, since a request to report measurements can be received by a large number of UEs more or less simultaneously and there is a great possibility that this large number of UEs also respond to these requests more or less simultaneously.

SUMMARY OF THE INVENTION

Embodiments the present invention provide a method for load control as well as a communication means node for implementing these methods.

A load control method according to claim 1 is provided, i.e. that said feedback of responses uses a different communication means, said different communication means being separate from said wireless network and having limited communication resources, and a transmission load caused in said different communication means by said feedback of said responses is controlled by said different communication means.

A communication means node according to claim 18 is also provided.

Detailed exemplary embodiments and advantages of the method for load control and the communication means node according to the invention will now be described with reference to the appended drawings illustrating some embodiments.

BRIEF DESCRIPTION OF THE DRAWINGS

FIG. 1 schematically shows a system for multimedia service transmission and feedback reporting, in which the load control mechanisms according to an embodiment of the invention are to be implemented.

DETAILED DESCRIPTION OF PREFERRED EMBODIMENTS

FIG. 1 schematically shows a system for multimedia service transmission and feedback reporting, in which the load control mechanisms according to an embodiment of the invention are to be implemented. In FIG. 1 it is shown that the UE performs statistics measurements, and reports to the network. It is further shown that the expected end receiver of data derived from the proposed UE statistics counters and measurements is not a radio node in the wireless network, but instead a network management entity, which could be supervised by an human operator, and possibly support tools used by the human operator.

The reference numerals in FIG. 1 refer to the following processing:
1. The UE is within expected coverage of MBMS. The UE may be receiving MBMS service, or the UE might not be receiving MBMS service.
2. The UE performs statistics measurements and maintain statistics counters with respect to MBMS reception, MBMS service and user experience of MBMS service.
3. The UE reports the results of the statistics measurements and counters to the network.
4. In the network, there may be several steps of data post processing and data conversion. The Radio Access Network (RAN) may be involved in post processing and data conversion to make it possible to optimize reporting by compression techniques that are specific to the radio access technology.
5. The result of post processing is presented to a human operator, possibly by using statistical indicators where results of measurements from many UEs are combined, possibly also combined with results reported from other nodes, possibly combined over certain time periods. Results might also be converted into alarms in the case of drastic changes.
6. Other results of statistics post processing, e.g. more detailed geographical information might be input to support tools, which the operator could use for network tuning and troubleshooting.

According to the invention, the UE uses different communication means, i.e. a communication mechanism that is separate from MBMS radio bearers or separate from the MBMS system, to report the result of statistics measurements and counters. In particular, it is possible that a UC system overlaid with a MBMS system can be used for reporting of results. This is especially interesting if the MBMS system is a DC system.

In processing 1-5 above with reference to FIG. 1, the reporting procedure for feeding back measurement reports has been described. Corresponding processing is also taken when other information is fed back. This other information can be non-network specific information, such as interactive information responses or the like.

There is also a need for checking a basic MBMS coverage on the whole. When performing such measurements, it can be advantageous to reach also UEs not listening to the MBMS network for the moment. This could, according to embodiments of the invention, be performed by using the unicast network, such as the RAN for ordering reports. The unicast network could then be used for ordering, possibly by using its broadcast channels, measurement reporting from the UEs as well as carrying the feedback information. In this particular case, the ordering entity is a part of the unicast network and the ordering entity orders measurements relating to the MBMS network. This is thus a measurement reporting procedure in which all information transmission is taking place in the unicast network, but the measurements are done in connection with the MBMS network, meaning that parameters of the MBMS network are measured.

These feedback procedures are in the UEs triggered by reception of a request broadcasted by the network. Such a broadcasted request can be received by a large number of UEs and the network has no way of knowing how many UEs that will respond to the request. There is thus a risk that a large number of UEs will respond to such a broadcasted request in a short amount of time rendering overload situations in the communication means, which carries the responses.

There is therefore a need for improvement regarding transmission load peaks due to transmission of reports, these peaks occurring when a large number of UEs are broadcasted a request for reporting a measurement or the like to an entity in the network.

In an embodiment, improvement is provided by letting the RAN control various radio access parameters and by using other specific load control mechanisms. The RAN itself has far better knowledge about the load situation in the RAN than other parts of the system. A much more exact and reliable load control is thus achieved by letting the RAN itself control the load control in the RAN.

Radio Access Control

According to the present invention, the RAN shall control the UE reporting behaviour. The reporting can include measurement reporting of information relating to statistics data, counters and other measurements. The reporting can also include information relating to interactive applications, such as voting or the like. Reporting can further also include UE counting used for bearer reconfigurations or other parameters used for configurations in the network. There are a number of advantages in letting the radio access network control the radio resources. This makes it possible to control the transmission load of the UE reporting to match the current available resources in the wireless interface, e.g. depending on current load, depending on overall capacity, carrier bandwidth etc. Furthermore, if the UE reporting is expected to cause a temporary increase in load of certain resources, e.g. increase in random access load or contention access load, the radio access network can temporarily re-assign radio resources to match this expected increase in load, e.g. allocate more frequencies, timeslots, codes or the like for, e.g., the random access or the contention access. This matching of resources can only be performed in an efficient way if it is handled by an entity that has full knowledge about the current load and other conditions of the wireless interface. The RAN itself is one of the entities having this full knowledge.

In particular, in accordance with an embodiment of the invention, it is possible for the network to control which random access or contention access radio resources that are to be used for the UEs. This control is done either by indicating to the UEs which resources to use when the measurement is requested, together with the measurement control information, or alternatively by indicating separately in another signaling information, e.g. by system information broadcast. This makes it possible to isolate the application of UE measurement reporting from other applications, so that overload induced by UE measurement reporting will not cause damage to other applications, and vice versa.

It is in a further embodiment of the invention possible for the RAN to explicitly control the contention behaviour of the random access or contention access for the application of UE statistics measurement reporting. This control includes control of parameters controlling random backoff, number of re-attempts, barring, etc. These control parameters are indicated to the UEs when the measurement is requested, together with the measurement control information, or separately in another signaling information, e.g., by system information broadcast. Controlling the contention behaviour makes it possible to optimize the random access for UE measurement reporting. The UE measurement reporting is particular in that it tolerates longer delays than other procedures. Measurement reporting is further particular since it often tolerates that not all UEs need to report. These specific tolerances for measurement reporting are by the present invention utilised for avoiding overload in the system. For instance, random backoff parameters can be set to high backoff delays, which give very high load tolerance but also give extra delays. The re-attempt parameter can further be set low, so that it is likely that some UEs will not succeed to do a random access at high load.

In order to be used for certain services or certain use-cases, a radio resource partition and its associated control parameters for random access or contention access behaviour is subsequently referred to as an Access Service Class (ASC). Different ASCs may use the same or different actual radio resources. This definition of an ASC is similar to the definition of an ASC used in 3GPP TSes 25.331 and 25.321.

Even though the radio resource separation and contention handling mechanisms of random access or contention access, ASC, etc., can take care of many of the load problems, they might not be able to handle all overload situations. If the amount of UEs that respond to a request is very high, more mechanisms may be needed to avoid contention.

Response Time Requirements

For statistics data, counters, or measurements according to embodiments of the present invention, the Radio Access Network (RAN) is not the main recipient of the measurement results. Instead, the main recipient is a management entity in the MBMS system, such as an O&M post-processing system or the like. Note also that normally the need for reported results is not immediate. Usually, results from large parts of the network are first collected to be post-processed regularly. A common time interval for post-processing of network statistics data is 15 minutes. Thus, time requirements for reporting can be expected to be in this time scale. Considering that UEs do the reporting, and not the network, requirements can probably be further relaxed, maybe up to the hours timescale, if found beneficial from other points of view.

The inventors have realised that these relatively long response time intervals make it possible to develop mechanisms for handling overload peaks that can occur in the system due to broadcasted measurement requests. The inventors have realised that mechanisms for transmission of this particular type of information therefore can be developed that prevent that all UEs report statistic measurement reports at the same time.

Three such mechanisms, a probability factor mechanism, a random time mechanism and a Service Specific Access Class Barring (SSACB) mechanism, for load control according to embodiments the present invention are described below.

Probability Factor

The concept of probability factor for load control of UE counting for MBMS multicast was defined in 3GPP MBMS Rel-6. In embodiments of the present invention, however, the probability factor concept is used for load control of measurement reporting and not for counting. There is an important network load difference between counting and measurement reporting. A UE that has done a measurement report, does not need to re-report this measurement, even if it would receive more requests for this report and the randomness function would trigger to report again. Thus, a UE that has reported a measurement result must store this result for further reporting. This will keep the load of the wireless interface at a low level. For counting, on the contrary, re-reporting is made if necessary, which can result in a higher load of the wireless interface.

The basic idea of the probability factor mechanism is that it will determine how many of all UEs that should send a report. The decision whether a UE should send or should not send a measurement report is thus here based on randomness, which is based on a network controlled probability factor. According to this mechanism, a fraction of UEs expected to report can be controlled (0-100%). There is thus a clear relation between this fraction and the number of responses that will be reported. This solution has the clear advantage that overload due to UE reporting could be avoided, since the number of transmitted reports can be controlled.

When using the probability factor solution, the control of the actual measurement and the reporting of the measurement can be separated by the network. Separated controls can make it possible for the network to first request measurement reporting and then try different probability factors. It is, for instance, possible to then start with a low probability factor, resulting in a few UE reports, and then (possibly in several steps) increase the probability factor until a sufficient number of UE reports are transmitted. This solution has the advantage that overload can be avoided and that the network can ensure that a sufficient number of UEs will report in order to get sufficient statistical accuracy for a particular measurement.

The same entity that configures the measurements in the RAN, e.g., the O&M data post processing system, also sets a parameter corresponding to the minimum number of UEs that shall report, in order to achieve sufficient statistical accuracy. This has the advantage of being a simple and uniform control of the measurement and its reporting requirements, when probability factor load control is used.

Random Time

A random time for the time to do the report can be used to spread out the UE reporting in time. This has the clear advantage that overload peaks could be avoided since the load is spread out.

The randomness, that is the random spreading times, is controlled by the RAN and a randomness mechanism is applied that assures that all UEs have reported within a certain time, when this is requested. This has the advantage that overload can be avoided and that the network also can assure that a sufficient amount of UEs report within reasonable time window.

In a particular embodiment, the randomness algorithm is an algorithm where the time window for reporting, or an equivalent parameter, is explicitly signalled by the network. The UE then pseudo-randomly selects any time within this window for generating a report. If the network finds that the reporting rate is low for a certain setting of the time window, the network then reconfigures the time window to a smaller one. The UEs that have not yet reported can then pseudo-randomly reselect the time to report. By this the network can start with a parameter setting suitable for a high number of UEs and then, if few UEs actually respond, speed up the process, thereby increasing the reporting rate. This has the advantage that the network dynamically can adapt to the number of UEs in the network.

The RAN can further set a latest-report-time parameter, this parameter corresponding to the requirement set by the principles of the operation of the O&M post-processing system. The latest-report-time parameter can be within the random time window, if such a time window is used. It is also possible that UEs can have randomly selected a reporting time after the latest-report time, and these UEs do then not have to report at all.

Alternatively, it is in another embodiment of the present invention suggested that a random time mechanism (as described above) for reporting can be used together with a probability factor mechanism. The probability factor mechanism is then used to limit the number of UEs that actually report, and the random time mechanism is used to spread out the reporting in time. The network can by these mechanisms thus limit the number of UEs that actually report.

Service Specific Access Class Barring (SSACB)

In GSM Edge Radio Access Network (GERAN) and UMTS Terrestrial Radio Access Network (UTRAN) of today, there is known a concept for Access Class barring and Service Specific Access Class Barring (SSACB) for overload control, as described in reference document [2]. There is a list of reference documents at the end of this description The Access Class Barring and also especially the SSACB known from background art is, however, not directed to load control for measurement reports in MBMS systems. The SSACB known from the background art is instead directed to restricting UEs to access to circuit switched calls, packet switched sessions and SMS during emergency situations. The conditions and purposes of the SSACB of the background art systems are thus totally different from the ones in embodiments of the present invention.

According to embodiments of the present invention, the SSACB mechanism is instead used for controlling the load of measurement reporting. It is, according to the invention, possible for the RAN to bar mobiles from making measurement reports using a service specific access class barring mechanism. This has the advantage that the O&M data processing system can stem the statistics measurements resorts coming from the UEs on the RAN and therefore protect the RAN and itself from any eventual overload. This mechanism would probably act as a last resort solution in the worse case scenario, where neither the random time nor probability factor mechanisms are enough to protect the RAN and the O&M data processing system from overload. SSACB is thus a reactive mechanism that tries to solve a problematic situation when it has happened, whereas random time and probability factor mechanisms are pre-active mechanisms that try to prevent a problematic situation from occurring.

The SSACB mechanism can also include a possibility to divide UEs according to access classes according to existing mechanisms (e.g. in 3GPP), and to further divide these UEs in another dimension, into groups based on service. One such service could be UE statistics data measurement reporting. The grouping, based on services could be the same as, or similar to the service grouping for Access Service Classes (ASCs), which corresponds to parameters for random access or contention access in the RAN. This has the advantage that the O&M system hereby can stem a percentage of the mobiles from sending measurements, thereby allowing the O&M system to recover from resets and further allowing a smooth recovery in case of catastrophic failures.

It is, according to embodiments of the invention, also possible to perform SSACB grouping based on the measurement control, more specifically based on whether UEs perform measurements for particular O&M data processing nodes. By performing grouping in this way, the O&M data processing system can protect the RAN and itself against overload in the way described above, without impacting measurement reporting towards other O&M data processing systems.

It is further possible for the RAN to protect itself by allocating a Service Class for the service grouping dimension of SSACB. There would thus be a hierarchy of such service classes. This could be seen as a further division of service classes into sub service classes according to data receiver. Depending on which data receiver being overloaded, different service specific access classes would be barred. The RAN here has the highest level in the hierarchy followed thereafter by each individual data processing node. This means that if a service specific access class is barred, which maps to a particular service, certain UEs and the RAN data receiver, the corresponding service specific access classes for other data receivers are also barred. According to this embodiment of the invention, the RAN can, dynamically, in a reactive way, switch off UE statistics data measurement reporting, if the RAN experiences heavy transmission load due to UE statistics measurement reporting or by other services or use cases.

The method for load control according to embodiments of the present invention and the communication means node for implementing the method make it possible for an exact and reliable load control for the communication means carrying feedback responses in the system. This is achieved by embodiments of the invention since the communication means carrying the feedback responses itself controls the load control mechanism for preventing overload situations on the communication means.

In an embodiment of the present invention, overload is prevented by using a Service Specific Access Class Barring (SSACB) mechanism, which bars receivers in certain SSACB groups from feeding back responses. This embodiment has the advantage that the statistics measurements reports coming from the UEs on the RAN can be stemmed and therefore protection of the RAN and the management entity from any eventual overload is possible.

In an embodiment of the invention, overload is prevented by using a probability factor mechanism, which controls a value corresponding to a fraction of the receivers that should feed back responses. This embodiment has the advantage that overload can be avoided and that the network can ensure that sufficient number of UEs will report in order to get sufficient statistical accuracy for a particular measurement.

In an embodiment of the invention, overload is prevented by using a random time mechanism, which spreads the responses in time by using a random time parameter for controlling when the receivers should feed back their responses. This embodiment has the advantage that overload can be avoided and that the network also can assure that a sufficient amount of UEs report within reasonable time window.

In an embodiment of the invention, a different communication means carrying the feedback responses, such as a Radio Access Network (RAN), controls which random access and contention access radio resources to be used for the feeding back of said responses, thereby controlling the transmission load in said RAN. This embodiment makes it possible to control the transmission load of the UE reporting to match the current available resources in the wireless interface of the communication means carrying the feedback responses. This matching of resources is only possible to perform in an efficient way if it is handled by an entity that has full knowledge about the current load and other conditions of the wireless interface. The RAN itself is one of the entities having this full knowledge.

Combinations

The probability factor, random time and SSACB mechanisms described above for avoiding that many UEs attempt to report at the same time can be separate from the random access or contention access parameters of the RAN, or can be integrated with the random access or contention access parameters and their handling.

The methods and communication means node according to embodiments of the invention may be modified by those skilled in the art, as compared to the exemplary embodiments described above.

In this description, the invention has been explained and exemplified by implementation in a system having an MBMS network and a RAN, such as a GERAN or UTRAN, overlapping each other in geographical coverage. This is, however, only an exemplary embodiment out of a number of possible implementations of the present invention. A person skilled in the art realises that any wireless multicast or broadcast network, overlapping any limited network, communication or transmission resources, can be used for implementing the invention.

REFERENCE DOCUMENTS

[1] 3GPP TS 26.346, Multimedia Multicast/Broadcast Service (MBMS), protocols and codecs.
[2] 3GPP TS 23.898, Access Class Barring and Overload Protection (ACBOP).
[3] 3GPP TS 25.346, Introduction of the Multimedia Broadcast Multicast Service into the Radio Access Network (RAN), stage 2.
[5] 3GPP TS 25.331, Radio Resource Control (RRC); Protocol specification

What is claimed is:

1. A method for load control, comprising:
receiving, by a receiver, a request communicated from an ordering entity via a management entity in a 3GPP Multimedia Broadcast Multicast Services (MBMS) network; and
feeding back, by the receiver, a response to the management entity via a different communication resource separate from the 3GPP MBMS network, wherein a transmission load caused by the response is controlled by the different communication resource.

2. The method according to claim 1, wherein overload of the transmission load is prevented by using a Service Specific Access Class Barring (SSACB) mechanism, which bars a receiver in a certain SSACB group from feeding back a response.

3. The method according to claim 2, wherein the SSACB group is defined in correspondence with parameters for random access or contention access behavior; and/or
the SSACB group is defined based on a receiver's participation in performing measurements for a particular management entity; and/or
a hierarchical order of service classes is defined, thereby allowing a hierarchical barring procedure.

4. The method according to claim 1, wherein overload of the transmission load is prevented by using a probability factor mechanism, which controls a value corresponding to a fraction of receivers that should feed back responses.

5. The method according to claim 4, wherein a value corresponding to a minimum number of responses is set by the management entity, the number of responses relating to the fraction; and/or
the fraction initially is set to a low value and is then stepwise increased until a sufficient number of responses are received.

6. The method according to claim 1, wherein overload of the transmission load is prevented by using a random time mechanism, which spreads responses in time by using a random time parameter for controlling when the receiver should feed back the response.

7. The method according to claim 6, wherein the random time mechanism is configured so that the receiver has responded within a time limit; and/or
a time window is sent to the receiver and the receiver can then randomly select a response time within this time window; and/or
a latest response time parameter is set by the management entity.

8. The method according to claim 7, wherein a length of the time window is dynamically adjustable, the length initially being set to a high value and then, possibly stepwise, being decreased if a response frequency is low.

9. The method according to claim 6, wherein the random time mechanism is combined with a probability factor mechanism so that a probability factor regulated number of responses are spread in time by the random time mechanism.

10. The method according to claim 1, wherein the different communication resource is a Radio Access Network (RAN), and the RAN controls which random access or contention access radio resources to be used for the feeding back of the response, thereby controlling the transmission load in the RAN.

11. The method according to claim 10, wherein the RAN controls contention behaviour by controlling any parameter from a group comprising: random-backoff time, number of re-attempts, and barring.

12. The method according to claim 10, wherein which resource to use is indicated to the receiver via an indication, the indication being comprised in any message from the group comprising: a measuring request message, a measurement control information message, a system information broadcast message, and another signalling information message.

13. The method according to claim 1, wherein the response comprises information relevant to a multimedia service transmission in the 3GPP MBMS network; and
the information comprises at least one quality measure for the multimedia service transmission, and/or
the information is transmitted to the management entity, the management entity utilising the information for tuning the 3GPP MBMS network, and/or the information comprises counting of receivers.

14. The method according to claim 1, wherein the response comprises non-network specific information; and
the non-network specific information comprises voting information, and/or interactive TV application data.

15. The method according to claim 1, wherein the 3GPP MBMS network provides multimedia service transmission, and the multimedia service transmission is of a broadcast type, or a multicast type.

16. The method according to claim 1, wherein the 3GPP MBMS network operates in a downlink only mode.

17. The method according to claim 1, wherein the ordering entity is a part of the different communication resource.

18. A communication means node comprising:
means for controlling a transmission load in a different communication resource separate from a 3GPP MBMS network, wherein the transmission load is caused by responses fed back by a plurality of receivers in the 3GPP MBMS network via the different communication resource, the responses respond to requests communicated from an ordering entity via a management entity in the 3GPP MBMS network.

19. The communication means node according to claim 18, wherein overload of the transmission load is prevented by using a Service Specific Access Class Barring (SSACB) mechanism, which bars the receivers in a certain SSACB group from feeding back responses; and/or
overload of the transmission load is prevented by using a probability factor mechanism, which controls a value corresponding to a fraction of receivers that should feed back responses; and/or
overload of the transmission load is prevented by using a random time mechanism, which spreads responses in time by using a random time parameter for controlling when the receivers should feed back their responses.

20. The communication means node according to claim 18, wherein the different communication resource is a Radio Access Network (RAN); and/or
the 3GPP MBMS network is configured to operate in a downlink only mode.

21. The communication means node according to claim 18, wherein the ordering entity is a part of the different communication resource.

22. A receiver, comprising:
means for receiving a request communicated from an ordering entity via a management entity in a 3GPP MBMS network;
means for feeding back a response to the management entity via a different communication resource separate from the 3GPP MBMS network,
wherein a transmission load caused by the response is controlled by the different communication resource.

23. The receiver according to claim 22, wherein the ordering entity is a part of the different communication resource.

24. The receiver according to claim 22, wherein the different communication resource is a Radio Access Network (RAN); and/or
the 3GPP MBMS network is configured to operate in a downlink only mode.

25. A communication system, comprising:
a 3GPP MBMS network to transmit multimedia service; and
a communication resource, separate from the 3GPP MBMS network, to feed back data to the 3GPP MBMS network, the feed back of the data causing a transmission load on the communication resource, and the communication resource controlling the transmission load caused by the feed back of the data.

\* \* \* \* \*